Figure 1:
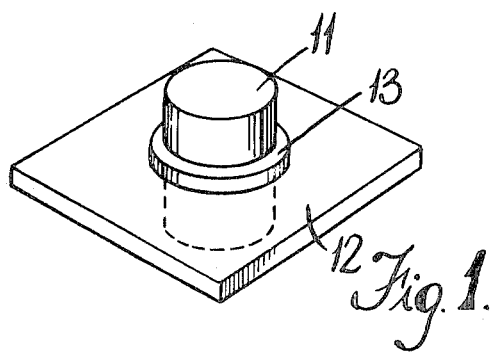

United States Patent

[11] 3,628,234

[72] Inventor Edward Alan Russell
 Pontypool, Wales
[21] Appl. No. 859,812
[22] Filed Sept. 22, 1969
[45] Patented Dec. 21, 1971
[73] Assignee Joseph Lucas Industries Limited
 Birmington, England
[32] Priority Sept. 30, 1968
[33] Great Britain
[31] 46,262/68

[54] CONNECTION OF METALS TO CERAMICS
 2 Claims, 2 Drawing Figs.
[52] U.S. Cl. .................................................. 29/473.1,
 29/500, 29/DIG. 35
[51] Int. Cl. .................................................... B23k 31/02
[50] Field of Search ............................................ 29/447,
 473.1, 473.5, 474.5, 500, DIG. 35

[56] References Cited
 UNITED STATES PATENTS
 1,774,231  8/1930  Harnsberger ................. 153/80.5
 2,163,409  6/1939  Pulfrich ........................ 29/473.1 X
 2,654,940  10/1953 Law .............................. 29/447 X
 2,728,425  12/1955 Day .............................. 29/473.1 X
 2,957,237  10/1960 Regle et al. ................... 29/500 X
 3,063,144  11/1962 Palmour ....................... 29/473.1
 3,402,458  9/1968  Asoff ............................ 29/473.1 X
 3,487,536  1/1970  Goldstein ..................... 29/473.1

OTHER REFERENCES
 Brazing Manual, published by American Welding Society, Inc., copyright 1963, pp. 66- 89.

Primary Examiner—John F. Campbell
Assistant Examiner—Ronald J. Shore
Attorney—Holman & Stern ABSTRACT: In the connection of a ceramic post to a metal plate, the post is located in a hole in the plate with a porous ring of brazing alloy surrounding the post in contact with the plate. The brazing alloy is then heated to braze the ring to the plate, and the invention resides in the provision of a ring of brazing alloy which has such an initial porosity that when the ring is heated to the brazing temperature the ring sinters to have less porosity and expands less than the post and so will be a tight fit on the post.

PATENTED DEC 21 1971

3,628,234

INVENTOR
Edward Alan Russell.
BY Holman, Glascock,
Downing & Seebold
ATTORNEYS

CONNECTION OF METALS TO CERAMICS

This invention relates to the connection of a ceramic post to a metal plate, and in one aspect resides in a method of forming such a connection, comprising locating the post within a hole in the plate, with a ring of brazing alloy surrounding the post in contact with the plate, and then heating the brazing alloy, characterized in that the ring of brazing alloy has a porosity such that when the ring is heated to the brazing temperature the ring will expand less than the post and so will be a tight fit on the post.

In its preferred form, the invention further resides in a ring of brazing alloy for use in a method as specified in the preceding paragraph, characterized in that the porosity of the ring is such that when the ring is heated to the brazing temperature its internal diameter does not increase. Preferably, the internal diameter decreases, but it should be noted that it is within the scope of the method according to the invention for the ring to expand, as long as it expands less than the post.

Figure 2:
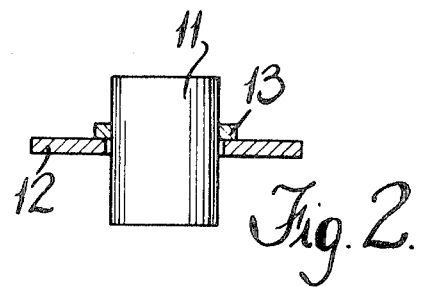

In the accompanying drawings,

FIGS. 1 and 2 respectively are perspective and side views of an assembly which can be interconnected according to one example of the invention.

Referring to the drawings, it is desired to connect a ceramic post 11 consisting of from 85 percent to 99 percent by weight of alumina and the remainder mainly silicon dioxide, to a stainless steelplate 12. For this purpose the post 11 is located in a hole in the plate 12 and is surrounded by a brazing ring 13 which is a close fit on the post 11 at room temperature. A typical brazing alloy has the following constituents by weight:

Silver    42 percent
Copper    18 percent
Lead    35 percent
Titanium  5 percent In a particular example, the post has a diameter of 0.895±0.001 inch with the hole in the plate of diameter 0.915±0.010 inch. Using these dimensions the ring must be as close fit on the post as possible, and so allowance must be made for the fact that when the ring is made by pressing in a die, then on removal from the die the ring may change in dimensions. As will be explained later, the forming pressure is important and whatever forming pressure is to be used, the expansion or contraction on relaxation must be previously determined experimentally and allowed for.

In order to form the connection, the ring 13 is heated in a nonoxidizing atmosphere to the brazing temperature of 860° C. in any convenient manner, whereupon the ring 13 is brazed onto the plate 12, and two separate effects determine the gap between the ring 13 and post 11, namely:

1. The ring 13 expands away from the post 11 because of the difference in the coefficients of thermal expansion of the two materials. The coefficients of the ceramic and alloy are respectively $7.9 \times 10^{-6}$ and $20 \times 10^{-6}$ and so on heating from room temperature to 860° C. the post 11 expands from 0.895 inch to 0.901 inch and the internal diameter of the ring 13, assuming an initial diameter of 0.898 inch increases to 0.914 inch.

2. At temperatures above 350° C., sintering of the alloy ring 13 will cause contraction of the ring by an amount which is dependent firstly on the porosity of the ring 13 before and after the brazing operation and secondly on the size of the ring. Once the two porosity values are known for a given size ring, the contraction can be calculated.

It will be apparent that in order to make a good joint, the overall expansion of the ring must be less than the expansion of the post. The thermal coefficients of both materials are fixed, and so is the final porosity of the brazing alloy, so that the only variable for a given ring is the initial porosity, which can be controlled to give the desired contraction of the ring relative to the post. The initial porosity depends on the pressure used to form the ring, and decreases with increasing pressure. For the figures quoted above, the maximum forming pressure which can be used is 13.2 t.s.i., which gives an initial porosity of about 18 percent, which results in a contraction of about 0.017 inch, which is in excess of the expansion of 0.016 inch, so ensuring a good joint.

Having thus described my invention what I claim as new and desire to secure by Letters Patent is:

1. A method of sealingly connecting a ceramic post in an aperture in a metal plate by using a porous ring of a brazing alloy which sinters on heating and reduces in porosity, comprising: choosing an initial porosity for said ring of brazing alloy depending on the expansion of the ceramic post on heating; locating the ring of chosen porosity to be a close fit on the post; assembling the ring and the post in said aperture in the metal plate so that the ring is in contact on one side thereof with the metal plate; selectively heating to braze the ring and the metal plate at their surface of contact whereby the porous ring of brazing alloy sinters and reduces in porosity and circumferentially grips the ceramic post to form a vacuumtight seal.

2. The method as claimed in claim 1 wherein the ring is die formed, and the initial porosity of the ring is controlled by altering forming-pressures on the ring in a die during die formation of said ring of brazing alloy.

* * * * *